United States Patent [19]

Ono et al.

[11] Patent Number: 4,521,814
[45] Date of Patent: Jun. 4, 1985

[54] METHOD AND APPARATUS FOR SIMULTANEOUSLY OUTPUTTING A GRAPHIC SIGNAL AND AN ALPHANUMERIC SIGNAL BY USING AN IMAGE REPRODUCING SYSTEM

[75] Inventors: Yoshio Ono; Seiya Sakamoto, both of Kyoto, Japan

[73] Assignee: Dainippon Screen Mfg. Co., Ltd., Kyoto, Japan

[21] Appl. No.: 541,796

[22] Filed: Oct. 13, 1983

[30] Foreign Application Priority Data

Oct. 13, 1982 [JP] Japan ............................... 57-180462

[51] Int. Cl.³ .................... G04N 1/22; G01D 15/06
[52] U.S. Cl. .................................. 358/296; 358/300; 346/160
[58] Field of Search ............... 346/108, 160, 153.1; 358/296, 300

[56] References Cited

U.S. PATENT DOCUMENTS 4,051,538  9/1977  Fox et al. .......................... 358/296

Primary Examiner—Thomas H. Tarcza
Attorney, Agent, or Firm—Lowe, King, Price & Becker

[57] ABSTRACT

Graphic signals and literal (or drawing) signals are recorded substantially simultaneously by increasing or decreasing the number of beam components output from at least one of a literal head and a graphic head after a specified number of scanning lines, both of which heads are being synchronously fed in the sub-scanning direction. Variation of the number of beam components used in the head is used to change the scan length of the head, for synchronizing the feed pitch therefor with the feed pitch of the other head when the scan lengths of the two are not integrally related. Differences between the feed pitch and the scan length of the variable scan length recording head are corrected by slight adjustments of the head position in the sub-scanning direction.

14 Claims, 9 Drawing Figures

Sub-scanning direction

METHOD AND APPARATUS FOR SIMULTANEOUSLY OUTPUTTING A GRAPHIC SIGNAL AND AN ALPHANUMERIC SIGNAL BY USING AN IMAGE REPRODUCING SYSTEM

FIELD OF THE INVENTION

This invention relates to reproduction of images by using devices such as color or monochrome scanners, and especially to such a reproduction in which both a pictorial or graphic signal and an alphabetic or numeric signal are output for substantially simultaneous recordation by two recording heads.

BACKGROUND OF THE INVENTION

Generally, printed material contains both pictorial (i.e. graphic) and alphanumeric (i.e., literal) components (the latter including drawing components), each of which is treated separately in a conventional process of photomechanics. Conventionally, both components are subsequently combined to form a complete reproduced image prior to the process of producing a press plate. However, this procedure is complicated and thus requires and consumes excessive quantities of time.

There has thus been recently developed a new type of image reproducing system. The newly developed system, a so-called "full-page make up system" or "total (lay-out) scanner" is being put to practical use in various fields. This system provides a scanner which utilizes a method of distributing pictorial and alpha-numeric components into desired positions by means of an all-electronic approach to the photomechanical process.

In the electronic approach, the graphic and literal components are input as signals to resepective input devices. The signals are then separately processed, since each component signal has a distinctive data structure. Furthermore, the literal data signal is converted into a raster-scanned data signal which is identical to that of the graphic data in order to be output simultaneously therewith by a recording device.

Of course, the literal data can be obtained as raster-scanned data from scanning of block copy which is preliminarily laid out in a desired formation. At any rate, in the prior art it is difficult to record both the graphic and literal components of the data simultaneously.

The difficulty arises not only because literal components require a higher resolution (smaller pixels), but also because graphic components are required to be variably recorded as functions of a halftone dot scale thereof (depending on the number of lines in a screen ruling) on request when recorded with halftone screens.

One prior art method for resolving this problem includes the steps of setting a scale of several graphic pixels for each of the literal pixels, and scanning a photosensitive material for recordng thereon, the scan having a predetermined number of lines with respect to that of graphic pixels. In said method multiple beam components, each of which can be individually controlled, may be arranged to form a line across the width of a scanning line (see, for example, U.S. patent application Ser. No. 390373). However, the above method is defective in having a reduced capacity for responding to a request for variation of the number of screen ruling lines.

Particularly, the setting of a desired number of screen ruling lines is a difficult task when the number is to be varied. Additionally, in order to maintain an integer proportional relation between literal and graphic pixels, there must be a sufficient number of beam components to cope with the requirement for a change in the number of said beam components due to variation in screen ruling, which results in a more expensive system.

Another method discloses the provision of separate scanning heads for graphic pixels and for literal pixels, the heads being used for recording (or exposing) the two types of pixels sequentially-e.g., first recording all the graphic pixels and thereafter recording all the literal pixels. This approach, however, requires performance of two whole scans by the heads. Although this is a reasonable approach for providing different recording beams having the respective appropriate diameters, the resulting exposure (or recording) time is doubled compared to that of simultaneous exposing.

SUMMARY OF THE INVENTION

In view of the above-described conventional problems, the present invention overcomes the prior art defects by providing separate scanning heads for each of the graphic (pictorial) pixels and the literal pixels and by rendering the separate heads, which have different numbers and diameters of their beam components, capable of a simultaneous recordation of images in a practical manner when the heads are moved in a sub-scanning direction.

It is thus a primary object of this invention to provide an image reproducing system capable of recording graphical and literal components simultaneously by using two scanning heads, each having a beam producer including a respective number and diameter of beam components, selected so that the heads may be used substantially simultaneously, and to synchronize feeding pitches of both beams in the sub-scanning direction by varying the number of beams (and thus the scan length) of at least one of the scanning heads, for example the literal components' scanning head, every specified number of scanning lines.

It is a further object of the invention to provide an adjusting displacement for one of the scanning heads in the sub-scanning direction to correct for discrepancies between the feeding pitch thereof and an integer multiple of the scan lengths thereof.

The above and other objects and features of this invention can be appreciated more fully from the following detailed description when read with reference to the accompanying drawings.

BEST MODE FOR CARRYING OUT THE INVENTION

Figure 1:
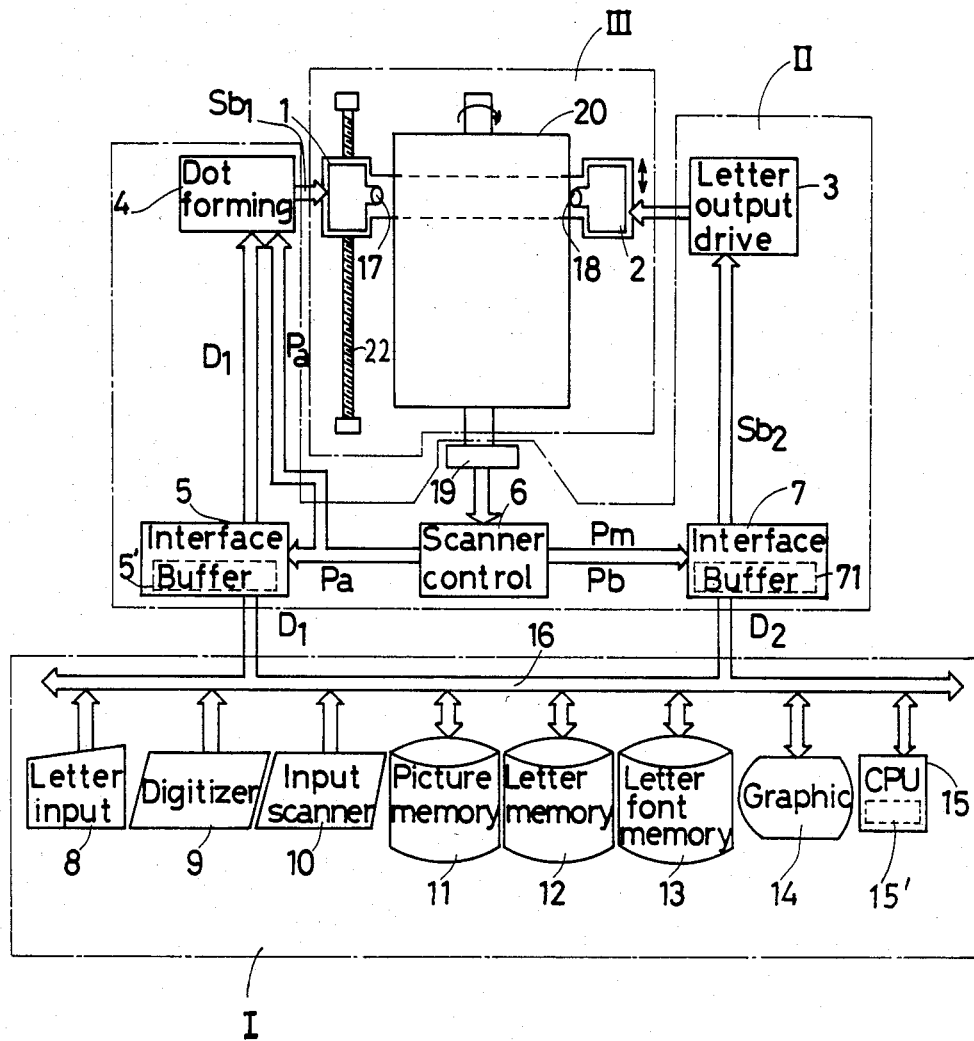
FIG. 1 is an embodiment of the method of this invention.

Referring to the drawings, FIG. 1 is an example of an image reproducing system to which the method of this invention is applied, which is composed of an input signal treating part I and an output signal controlling part II and an output part III. For the system of FIG. 1, the method of treating input signals of graphic and literal data is first explained as follows.

Literal data from a literal input device 8 are stored as a file in a memory (not shown) of a CPU (central processing unit) 15 after being converted into literal codes, representing the literal. Then, by designating the desired addresses of said literal codes according to a layout chart prepared in advance by a digitizer 9, literal font data corresponding to said literal codes are retrieved from a literal font memory 13 and input to a literal (and drawing component) memory 12.

Certain drawing data, such as used in charts or ruled lines, however, may also be written into certain cells of the literal memory 12 with addresses determined in the same manner as for literal data.

Furthermore, these literal and drawing data can be modified on request by the use of a modification graphic device 14 composed of a display, such as a CRT displaying device.

It is noted that binary data representing either a literal or drawing element may also be input by scanning of an input scanner 10 independently of the aforesaid method.

On the other hand, graphic data obtained from an original picture with use of the input scanner 10 undergo color correction, magnification conversion, etc., and are stored in a temporary memory device (not shown in the drawings). Thereafter, having been designated their addresses by the digitizer 9 and the graphic output device 14 according to a layout chart which may be useful as well for the literal components, said graphic data are written into the designated cells of a graphic memory 11.

In this manner, graphic and literal data are output to a graphic output head 1 and a literal output head 2 respectively, which are synchronized in their feeding pitch in the sub-scanning direction by means of a common feeding gear 22, according to address signals to control laser beams for recording graphic and literal components. The beam components output by heads 1 and 2 are imaged on drum 20 by imaging lenses 17 and 18, respectively.

The graphic and literal heads, however, may have different numbers and/or diameters of their respective beams, which fact renders it impossible to synchronize the heads in a common feeding pitch in the sub-scanning direction. The solution of this problem is the main purpose of this invention.

Figure 2:
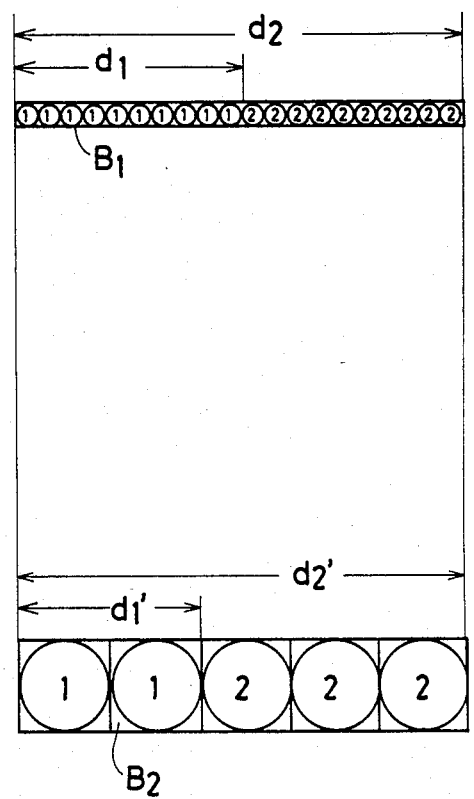
FIGS. 2 and 3 illustrate charts useful for explaining a relationship between a beam of a graphic output head and a beam of a literal output head.

FIG. 2 shows the general concept of this invention, in which $B_1$ represents laser beam components of the graphic output head 1. Preferably, the components $B_1$ are 1/4000 inch in diameter and graphic output head 1 is capable of emanating ten beam components at a time as illustrated by components 1, 2 of $B_1$. $B_2$ represents laser beam components of the literal output head 2 (provided for responding to literal and drawing data signals), the beam components preferably being 1/1000 inch in diameter. The literal output head 2 is preferably capable of emanating either two or three beam components selectively at a time, as illustrated by components 1, 2 of $B_2$.

In the above illustration, the graphic output head can scan a width of $d_1 = 1/4000 \times 10 = 1/400$ inch at a time, defined as the scan length thereof, while the literal head 2 can scan a width of $d_1' = 1/1000 \times 2 = 2/1000$ inch, defined as the scan length thereof when two beam components are used at a time. The difference in scan lengths thus prevents synchronization of feeding pitches of the two heads. However, it is noted that in two scan times the graphic output head 1 scans a width of $d_2 = 2/400 = 1/200$ inch, while the literal output head 2 can be made to scan a total width of $d_2' = 2/1000 + 3/1000 = 1/200$ inch in two scans if the number of beam components thereof is changed from two to three in the two scans. Thus, the total widths $d_2$ and $d_2'$ scanned in two scans may be made to coincide.

In other words, in accordance with the present invention there is provided a variable scan length recording head, having two scan lengths (for example) which are shorter and longer than the scan length of the second recording head. The scan length is varied so that the sum of small integer multiples of the two scan lengths of the one head corresponds to a small integer multiple of the scan length of the second head, thereby permitting synchronization of sub-scan feeding of the two heads.

In the aforesaid method, however, since the literal output head 2 alternately uses two and three beam components to complete the scanning of a width equivalent to that of five beam components, there results a discontinuous scan if the feeding pitch of the literal head 2 is synchronized (at 1/400 inch) with that of the graphic output head 1. This problem is overcome as follows.

Figure 3:
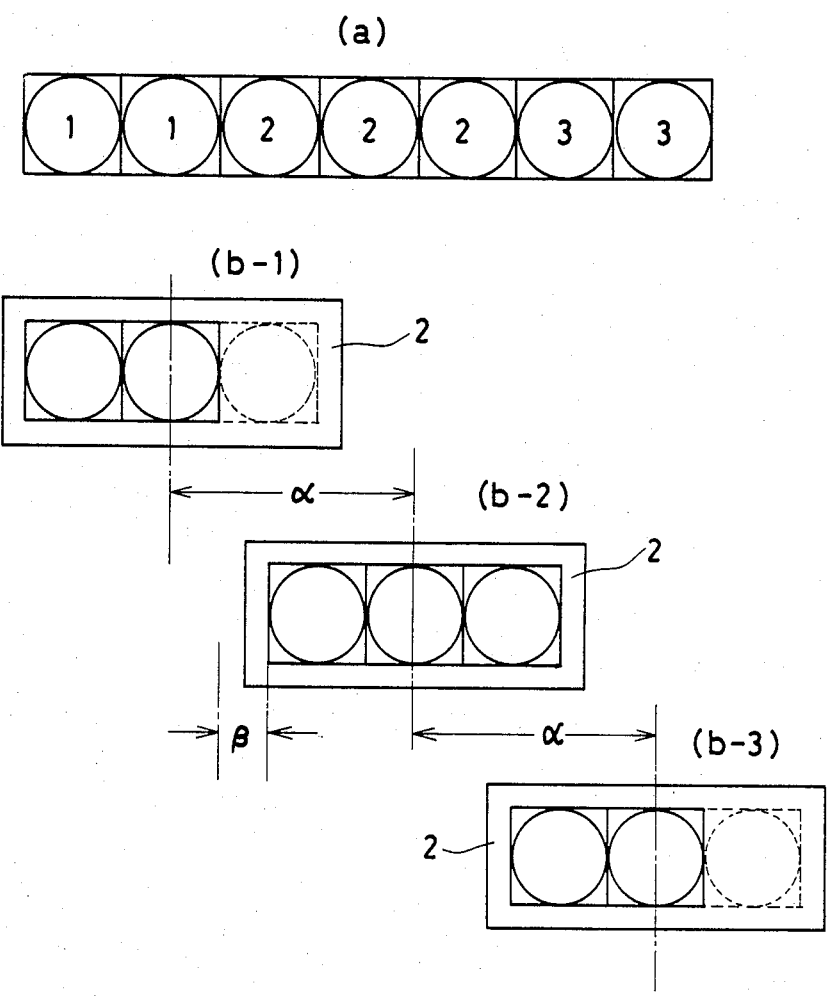

The present invention employs a literal head 2 which has a beam producer capable of scanning with either three or two beam components as is shown in FIG. 3(b) when a scan shown in FIG. 3(a) is to be performed. That is, after performing a first scan with two beam components, as shown in FIGS. 3(b-1), a scan is carried out with three beam components as shown in FIG. 3(b-2). To perform the second scan, the literal output head 2 is fed (displaced) in the subscanning direction by a feeding pitch $\alpha$ (in this embodiment, $=1/400$ inch) in synchronism with the movement of the graphic output head. At the beginning of the second scan a gap $\beta$ results, representing the difference between the common pitch and the scan length of the two beam components of head 2. In this embodiment, gap $\beta = 1/400 - 2/1000 = 1/2000$ inch, which is equivalent to half the diameter of said beam components. This gap exists between the place where the head is and the place where it should be for continuous scanning to take place in the sub-scanning direction, as shown in FIG. 3(b-2). However, it is noted that in carrying out a scan with two beam components as shown in FIG. 3(b-3) after the scan of FIG. 3(b-2), the literal output head is again displaced by $\beta$, resulting in an overlap of $3/1000 - 1/400 = 1/2000$ inch for the two scans, corresponding to the difference between the scan length of the three beam components and the pitch.

The present embodiment employs the literal output head 2 as follows to correct the gap and to eliminate the overlap on the sub-scanning line.

Figure 4:
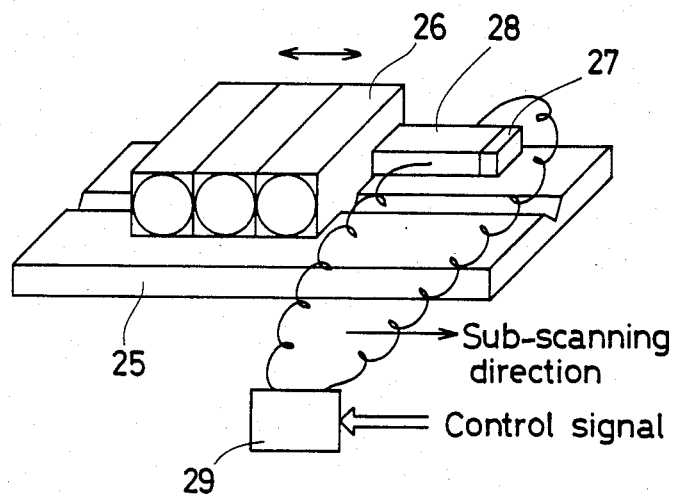
FIG. 4 is an embodiment of a literal output head of the invention.
Figure 5:
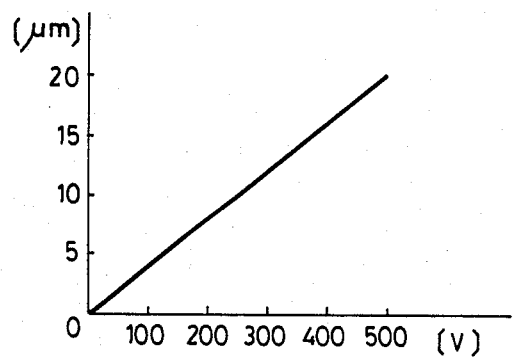
FIG. 5 is an example of a characteristic curve of a piezo-electric element shown in FIG. 4.

FIG. 4 is an illustration explaining the structure of the inventive literal output head, in which 25 is a chassis for the literal output head 2 which is moved in synchronism with the graphic output head 1, 26 is a beam producer which is capable of being moved independently for adjustment, 28 is a type of piezo-electric material which may have a characteristic as illustrated in FIG. 5, one end of which material is fixed to a side of the beam producer and the other end of which is fixed to the chassis.

Therefore, in a so-called blanking time provided between the first and second scans, input of a control signal to a high voltage producer 29 results in the piezoelectric element 28 changing its form to shift the beam producer 26 somewhat, independently of feeding in the sub-scanning direction, thus resulting in adjusting the gap $\beta$ shown in FIG. 3(b-2).

For the third scan time, cutoff of the high voltage signal of high voltage producer 29 results in setting the beam producer 26 back to its original position appropriate for the next scan. Thus, the overlap between the second and third scans is eliminated. By repeating the aforesaid routine, subsequent scanning can be performed resulting in simultaneous recording of graphic and literal components, It should be noted that a lens to focus the beam from the beam producer 26 on a recording drum 20 may be movable in accordance with that of the beam producer 26, or may be fixed if the lens is capable of covering the above described shifting of the beam producer 26. Furthermore, the method of this invention may be applied to more complicated cases.

Assuming that the diameter of beam components of the graphic output head 1 is $a_1$, the number of its beam components is $n_1$, the diameter of beam components of the literal output head 2 is $a_2$, and the number of its beam components is $n_2$ or $n_3$ ($n_3 = n_2 + 1$) having a relationship between them of $n_2 a_2 < n_1 a_1, n_3 a_2$, the shifting distance can be calculated as follows:

The first time: $n_1 a_1 / a_2 = n_2 + \alpha_1$
where $n_2$ is an integer and $\alpha_1$ is a decimal.

The second time:  $2(n_1 a_1)/a_2 - n_2 = n_2 + 2\alpha_1$ $n_2 + 2\alpha_1$ where $2\alpha_1 < 1$ $= n_3 + (2\alpha_1 - 1)$ where $2\alpha_1 > 1$ The third time: $3(n_1 a_1)/a_2 - 2n_2 = n_2 + 3\alpha_1$ $n_2 + 3\alpha_1$ where $3\alpha_1 < 1$ $= n_3 + (3\alpha_1 - 1)$ where $3\alpha_1 > 1$ or  $3(n_1 a_1)/a_2 - (n_2 + n_3) = n_2 + (3\alpha - 1)$
$n_2 + (3\alpha_1 - 1)$ where $3\alpha_1 - 1 < 1$ $= n_3 + (3\alpha_1 - 2)$ where $3\alpha_1 - 1 > 1$ The same calculation can be applied to subsequent scanning lines. For example, where the feeding pitch for the graphic output head 1 is supposed to be 350 lines per inch (=71.43 $\mu$m pitch) and feeding pitch for the literal head 2 is supposed to be 1000 lines per inch (=25 $\mu$m pitch) (in this case the latter is per one beam component), the required shifting distances are obtained as follows. For seven feeds of the graphic output head, 500 $\mu$m will be scanned, as will be the case for twenty beams of the literal head. After the $k^{th}$ 71.43 $\mu$m feed of the graphic and literal heads, the cumulative feed of the two heads will total (k)(71.43 $\mu$m). The number of beam elements of head 2 to be used during the $k^{th}$ scan is determined by determining a cumulative beam width which is closest to the cumulative feed displacement, subtracting therefrom the total cumulative beam width closest to the $(k-1)^{th}$ cumulative feed, and dividing the difference by the beam width. The cumulative beam width closest to the $(k-1)^{th}$ feed is defined as the integer multiple component of team diameters closest to the amount of feed provided in k-1 feeds. The necessary shifting of the literal head for the $k^{th}$ scan is determined by subtracting the cumulative beam width closest to the cumulative feed for the $k^{th}$ scan from the cumulative feed of the $k^{th}$ scan. Thus, during the seven scans for the present example, the following results are obtained.

| Scan No. | No. of Beam Components | Scan Length for $k^{th}$ Scan | Cumulative Feed | Cumulative Beam Width | Shift Adjustment |
|---|---|---|---|---|---|
| 1 | 2 | 50 $\mu$m | 71.43 | 50 | 21.43 $\mu$m; |
| 2 | 3 | 75 $\mu$m | 142.86 | 125 | 17.86 $\mu$m; |
| 3 | 3 | 75 $\mu$m | 214.29 | 200 | 14.29 $\mu$m; |
| 4 | 3 | 75 $\mu$m | 285.72 | 275 | 10.72 $\mu$m; |
| 5 | 3 | 75 $\mu$m | 357.15 | 350 | 7.15 $\mu$m; |
| 6 | 3 | 75 $\mu$m | 428.58 | 425 | 3.58 $\mu$m; |
| 7 | 3 | 75 $\mu$m | 500 | 500 | 0.00 $\mu$m. |

In this case, two beam components of the literal output head 2 are used at the first time, and three beam components of the letter output head 2 are used at the second and following cycles and shifting the beam producers of the literal output head 2 by the shift adjustment determined in accordance with the foregoing procedure enables the literal output head 2 to move in accordance with the graphic output head 1 in the sub-scanning direction.

Figure 6:
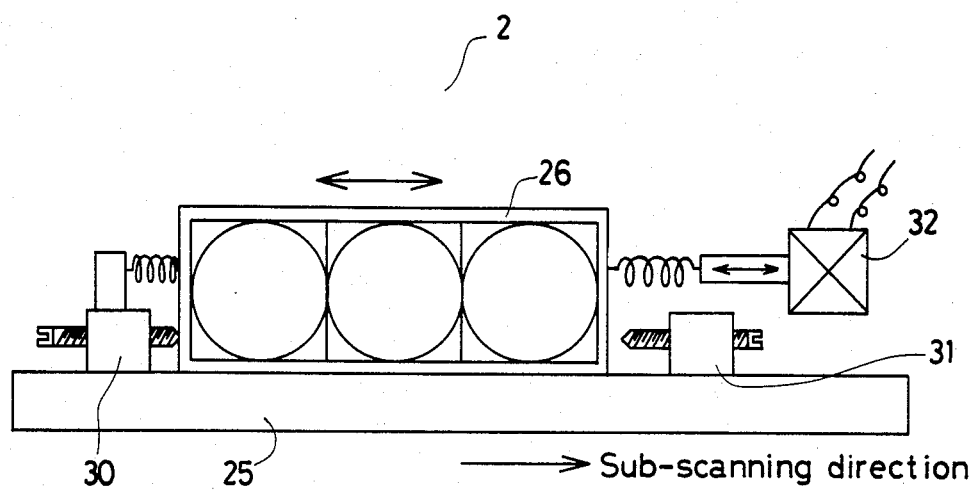
FIGS. 6 and 7 are other embodiments of literal output heads.

FIG. 6 shows a structure of a literal output head 2

FIG. 6 shows a structure of a literal output head 2 of another embodiment of the invention, in which adjusting screws 30, 31 and an electromagnetic solenoid 32 are employed instead of the piezo-electric element 38.

In FIG. 6, to correct the gap $\beta$ the solenoid 32 is provided for adjusting the position of the beam producer 26 independently of the chassis 25, the adjusting distance being set by the screws 30,31.

Figure 7:
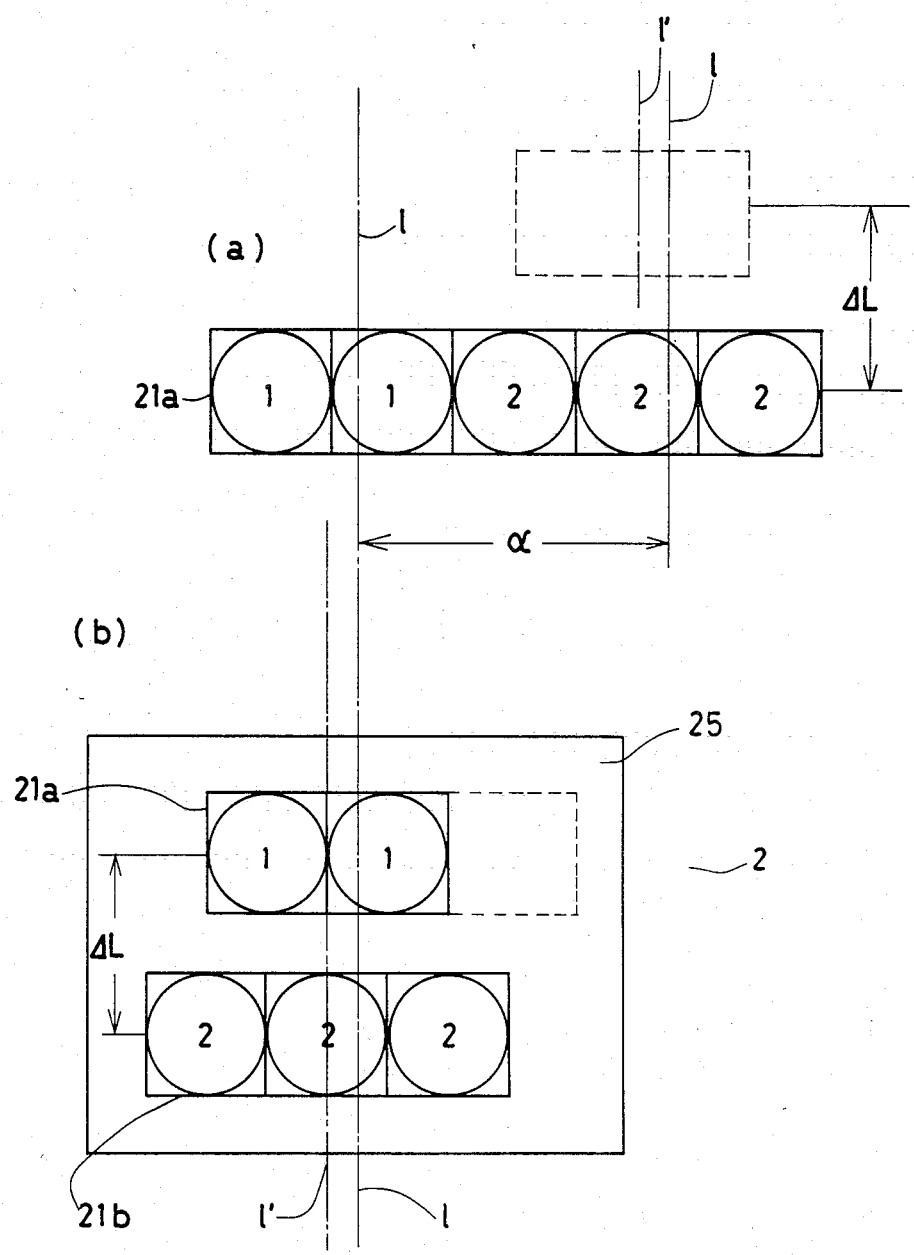

The present invention can also be realized by using a literal output head 2 which has a two beam producer 21a and a three beam producer 21b without performing an adjustment. More precisely, as shown in FIG. 7(b), the axis (1') of both beam producers 21a, 21b may be shifted by one fourth of a beam diameter in the sub-scanning direction with respect to the axis 1 of the chassis (in this case by 1/4000 inch). Thus, at the end of the first scan by the two beam producer 21a, the two beam producer situates at the location shown in a broken line in FIG. 7(a), and the three beam producer 21b automatically situates in a proper position without producing either a gap or an overlap on the sub-scanning line. In FIG. 7, $\Delta L$ is a gap on the main scanning line between the beam producers 21a and 21b which is to be appropriately set according to such parameters as a revolution speed of a recording drum 20.

As mentioned above, a reproduced image with properly laid-out graphic and literal components is produced by use of the output control unit II and the output unit III as is shown in FIG. 1. The following is an explanation of said units II and III.

In operation, a pair of timing pulses is produced by an encoder 19 and an output scanner control circuit 6. A timing pulse Pa is generated to control the graphic output head 1 and a timing pulse Pb to control the literal output head 2. The timing pulse Pa is used as a signal to output graphic data $D_1$ from an interface 5 to a dot forming circuit 4. The graphic data $D_1$, after being stored in a buffer memory 5' of said interface 5, are changed into proper data format for said dot forming circuit 4.

Figure 8:
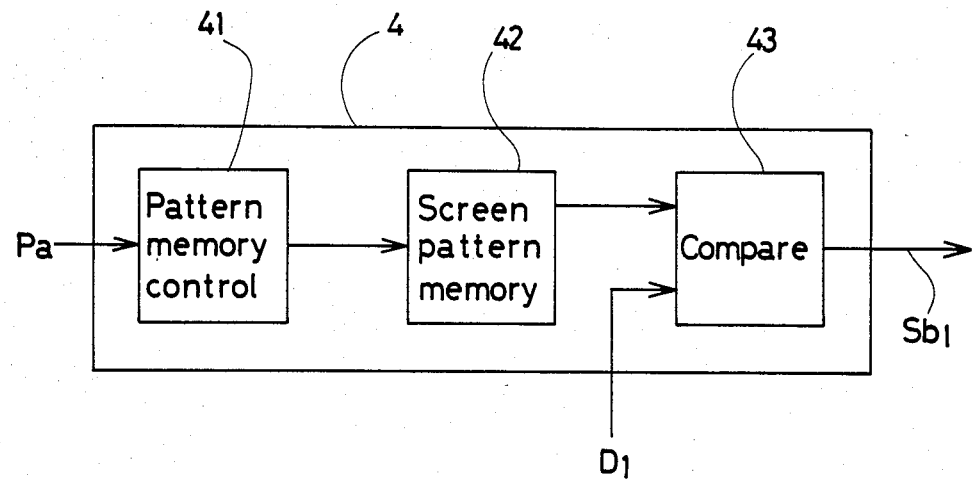
FIG. 8 is an example of a dot formation circuit used in the embodiment of FIG. 1.
Figure 9:
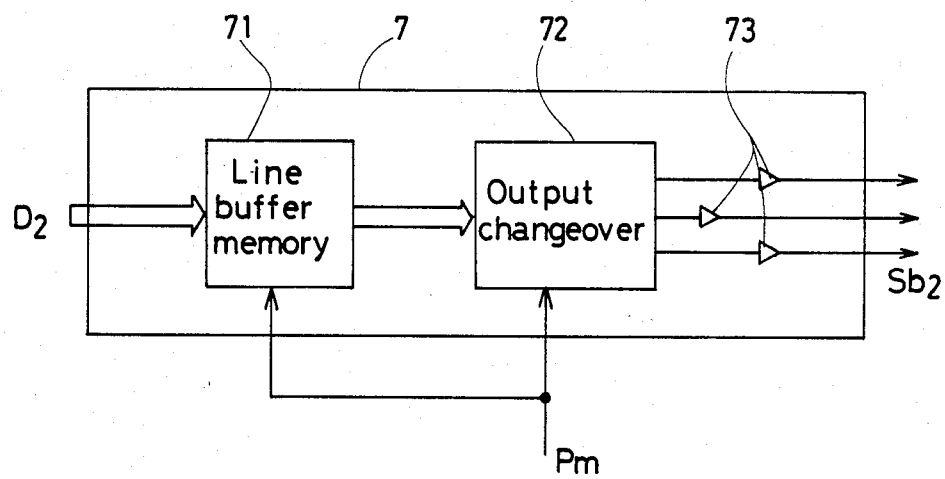
FIG. 9 is an example of an interface circuit.

The timing pulse Pa is also input to the dot forming circuit 4, to trigger a pattern memory controller 41 there to read a halftone dot pattern signal from a pattern memory 42. In a comparing circuit 3, the controller 41 compares the dot pattern with the graphic data $D_1$ output from interface 5, and outputs a control signal $Sb_1$ to turn on or off the beams to the graphic output head 1 as is shown in FIG. 8.

Methods for producing a halftone image directly from a graphic signal which has graduated tone are disclosed in U.S. Pat. No. 3,725,574 and U.S. patent application Ser. No. 365,890 (British Patent Application No. 8208940 Publication No. 2098022). Accordingly, a detailed explanation of the methods is omitted from the present description. The circuit in FIG. 8 is operable for controlling one beam. Accordingly, in a practical circuit there are provided ten similar circuits in all.

On the other hand, the literal data input from the literal memory 12 to a line buffer memory 71 of an interface 7 on command of the CPU 15 are converted into literal raster data $D_2$ in an external changeover circuit (not shown in the figures) referring to the front data stored in the literal font memory 13. The data $D_2$ are then rearranged to be utilized for output from the output head of the beam producer from which emanate two or three beams simultaneously. Furthermore, the rearranged data $D_2$ are read in synchronism with the literal timing pulse Pb from the line buffer memory 71.

Thus, literal raster data $D_2$ read from the line buffer memory 71 are then input to an output line changeover circuit 72 which changes the number of data lines according to the number of beam components to be used in the literal output head 2.

That is, as the literal output head 2 changes the number of the beam components to be used (between two and three beams) every revolution of the recording drum 20, the number of data lines must be changed in synchronism with the revolution pulse Pm (every revolution of the recording drum 20) according to the number of beam components utilized.

Furthermore, thus rearranged literal data of the appropriate number of lines are input as a beam driving signal $Sb_2$ via a driving amplifier 73 to a literal output driving circuit 3.

In this manner, a graphic recording beam $B_1$ and a literal recording beam $B_2$ are generated from their respective beam producers at the same time, upon command of said control signals $Sb_1$, $Sb_2$, to record a complete reproduced image, having both graphic and literal components, on a film or other recording medium.

In the described embodiment, when the screen ruling has to be changed according to an input request, such a procedure can be easily performed with a zoom lens as the image formation lens 17 of the picture output head 1 (or with a selected one of a plurality of lenses, each of which has a distinct magnification) by varying the screen ruling according to the magnification of the lenses. To synthesize the feeding pitches of the literal and graphic heads, two methods can be adopted. One of the methods is to vary the number of beam components of the literal output head and to adjust length according to the magnification of an employed lens. The other is to employ a zoom lens as an imaging lens 18 for the literal output head, the magnification of which is equivalent to that of the graphic output head 1. When various numbers of screen rulings are used and the differences between them are considerable, the number of beam components of the literal output head should be increased beforehand, while if a fine screen ruling is used (i.e., narrow screen line width), the number of beam components actually used in the scan may be reduced, i.e., deactivated.

The procedure of varying the number of screen rulings can also be attained by changing the number of beam components of the graphic output head 1.

In this case, the number of screen rulings can be varied by changing the number of beam components of the graphic output head 1, which also requires a corresponding change of the number of beam components of the literal output head 2.

Assuming that the number of beam components of the graphic output head 1 is six, (the diameter of each beam component is 1/4000 inch), two times the sub-scanning length of the grahic output head 1 is 6/4000+6/4000=3/1000 inch. Thus, in two scans a 3/1000 inch segment is reproduced. Assuming that the diameter of each beam component of the literal output head 2 is 1/1000 inch, the graphic and literal heads can be synchronized in the sub-scanning direction by using two beam components of the literal output head in a first scan and by using a single beam component of the literal output head during the second scan.

In the above embodiment, the same result can be attained by selectively using a proper number of beam components of the graphic output head 1. However, in order to secure uniformity of halftone dots (for recording picture components), it is preferable to increase or decrease the number of beam components of the literal output head rather than using such a procedure on the beam components of the graphic output head.

As mentioned above, the thrust of the present invention is to synchronize the feeding pitches of a graphic output head and a literal output head in the sub-scanning direction to record graphic and literal components simultaneously by changing scan length of at least one of the recording heads. Preferably, this feature is attained by changing the number of beam components of the literal head after scanning a predetermined number of scanning lines when an image reproducing procedure is performed with the graphic and literal output heads, which each have a respective set of beam components including a particular number and diameter of such components.

Therefore, the present invention has an advantage of easily recording graphic and literal components simultaneously, even when the screen ruling is required to be varied, which has proved troublesome to implement in the prior art.

The foregoing description of the preferred embodiment of the invention has been presented for purposes of illustration and description, and is not intended to be exhaustive or to limit the invention to the precise form disclosed, since many obvious modifications and variations are possible in light of the above teaching. The embodiment was chosen and described in order best to explain the principles of the invention and its practical application, thereby to enable others skilled in the art best to utilize the invention in various embodiments with various modifications as are suited to the particular use contemplated. It is intended that the scope of the invention be defined by the claims appended hereto, when interpreted in accordance with the full breadth to which they are fairly and legally entitled.

We claim:

1. A method of outputting substantially simultaneous signals representing graphic and literal data components for reproduction on an image reproducing system, in which graphic and literal components are recorded simultaneously to form a complete reproduced image comprising the steps of:
   (a) providing output heads for said graphic data components and said literal data components respectively, each of said heads having a beam producer producing a distinct number of beam components having distinct diameters,
   (b) said heads scanning an image receiving member in a primary scanning direction, and
   (c) feeding both said output heads synchronously in a sub-scanning direction.

2. A method according to claim 1, comprising the further steps of:
   (a) increasing or decreasing the number of beam components of at least one output head corresponding to a certain number of scanning lines,
   (b) providing an adjusting displacement in the sub-scanning direction for the beam producer of said output head having the variable number of beam components when sub-scanning lengths of said output heads; represented by a product of the diameter of the beam components and the number of the beam components of said output heads, do not coincide.

3. A method according to claim 1 wherein said providing step comprises the further step of providing to both of said output heads multiple beam producers, each of which have a distinct number of beam components, and
   adjusting each of said multiple beam producers in said sub-scanning direction when sub-scanning lengths of said output heads represented by a product of the diameter of the beam components of said output heads and the number of the beam components do not coincide.

4. A method of recording an image containing graphic and literal data on a medium in an apparatus having separate graphic and literal recording heads each including beam producers having distinct numbers and diameters of beam components, comprising the steps of:
   (a) scanning the medium in a primary scan direction, and
   (b) synchronously feeding said graphic and literal heads in a sub-scanning direction,
   whereby data signals provided to both said recording heads are recorded substantially simultaneously on said medium.

5. A method according to claim 4 wherein said synchronous feeding step comprises the steps of:
   (a) determining sub-scanning lengths for the two heads represented by a product of the number and diameter of beam components for each head, and
   (b) varying the number of beam components in at least one of said recording heads when said sub-scanning lengths of said heads are unequal, thereby to provide a plurality of sub-scanning lengths for said at least one recording head and to provide a common sub-scanning feed pitch corresponding to a sum of small integer multiples of said plural sub-scan lengths of said one head and to a small integer multiple of said sub-scan lengths of the other head.

6. A method according to claim 5 comprising the further step of adjusting displacement of said at least one head in said sub-scanning direction to compensate for differences between said sub-scanning feed pitch and said plural sub-scan lengths thereof.

7. A method according to claim 6 wherein said step of synchronoously feeding comprises the further steps of:
   selecting from at least two values a scan length of at least one of said recording heads from at least two values;
   providing said selected scan length to said one recording head to enable a sum of said selected values of said scan lengths to correspond to a number of scan lengths of the other of said recordng heads.

8. A method according to claim 7 comprising the further steps of providing a common feed pitch for said two heads to correspond to a scan length of the other of said recording heads.

9. A method according to claim 8 comprising the further step of adjusting a displacement of said one of said recording heads to compensate for variations between a cumulated number of feeds at said common feed pitch in said sub-scan direction and the actual sum of said scan length values thereof.

10. In an apparatus for recording an image on a medium by scanning the medium in a primary scanning direction and feeding recording heads in a sub-scanning direction, the apparatus having two recording heads, the two heads having different scan lengths determined by respective products of numbers and diameters of beam components thereof, the improvement comprising:
    synchronizing means for synchronizing movement of said two recording heads, including
    means for feeding said recording heads substantially simultaneously in said sub-scanning direction.

11. An apparatus according to claim 10 wherein said synchronizing means includes means for varying a scan length of at least one of said heads in said sub-scanning direction.

12. An apparatus according to claim 11 wherein said means for varying comprises an adjustable scan length recording head having a plurality of beam components for scanning said medium in said primary scan direction, and
    means for activating at least first and second numbers of beam components thereon to provide at least first and second scan lengths, respectively, for said one recording head.

13. An apparatus according to claim 12 wherein said means for activating is operable for providing said first scan length smaller than a scan length of another of said recording heads and said second scan length larger than said scan length of the other of said recording heads.

14. An apparatus according to claim 11 further comprising adjusting means for adjustably displacing said other head in said sub-scanning direction to compensate for differences between feeding pitch and scan lengths thereof.

* * * * *